United States Patent [19]

Mullins, Jr.

[11] 4,441,411

[45] Apr. 10, 1984

[54] SLICER FOR HAM OR THE LIKE

[76] Inventor: James N. Mullins, Jr., 2116 Williams Pl., Fort Worth, Tex. 76111

[21] Appl. No.: 488,034

[22] Filed: Apr. 25, 1983

[51] Int. Cl.³ .......................... A23N 7/00; A47J 17/00

[52] U.S. Cl. .......................................... 99/538; 99/537; 99/593; 99/597

[58] Field of Search .................. 99/537, 538, 541, 593, 99/594, 491, 492, 595–599; 83/451, 471.2, 483, 488, 703, 704, 478, 544–546, DIG. 1; 82/48

[56] References Cited

U.S. PATENT DOCUMENTS

| | | | |
|---|---|---|---|
| 3,951,054 | 4/1976 | Frentzel | 99/538 |
| 4,287,820 | 9/1981 | Urban | 99/538 |
| 4,332,190 | 6/1982 | Mart | 99/538 |

*Primary Examiner*—Timothy F. Simone
*Attorney, Agent, or Firm*—Wofford, Fails & Zobal

[57] ABSTRACT

Apparatus for slicing ham or the like comprising a ham holder adapted to hold the ham to be sliced and journalled for rotation so as to spin the ham, motor spinning the ham holder, rotatable slicer blade and motor spinning the blade and respective rams for moving the blade into cutting engagement with the ham while simultaneously moving it upwardly so as to cut a continuous spiral around the bone of the ham. Respective adjustment means are provided for adjusting the thicknesses of the slices of ham that are produced and for securing the respective order of moving the cutting blade away from the ham before it is brought upwardly or downwardly from its finishing position to its starting position.

11 Claims, 8 Drawing Figures

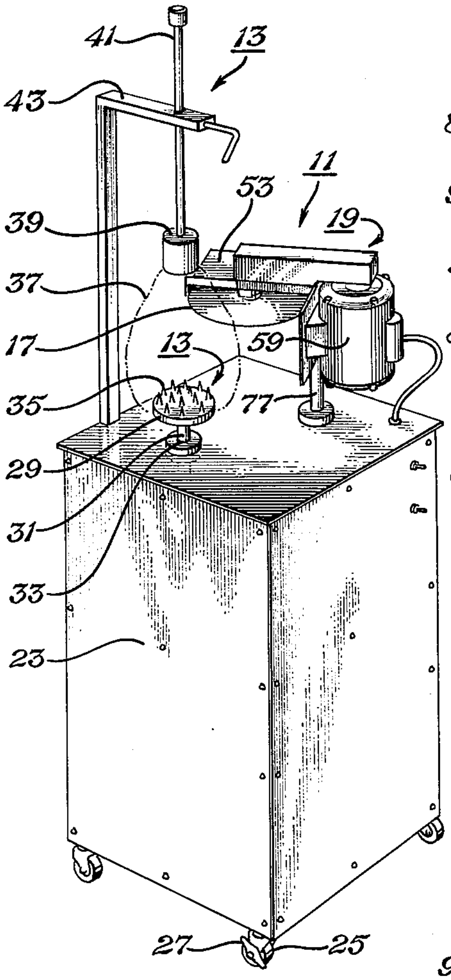
Fig.1
Fig.3
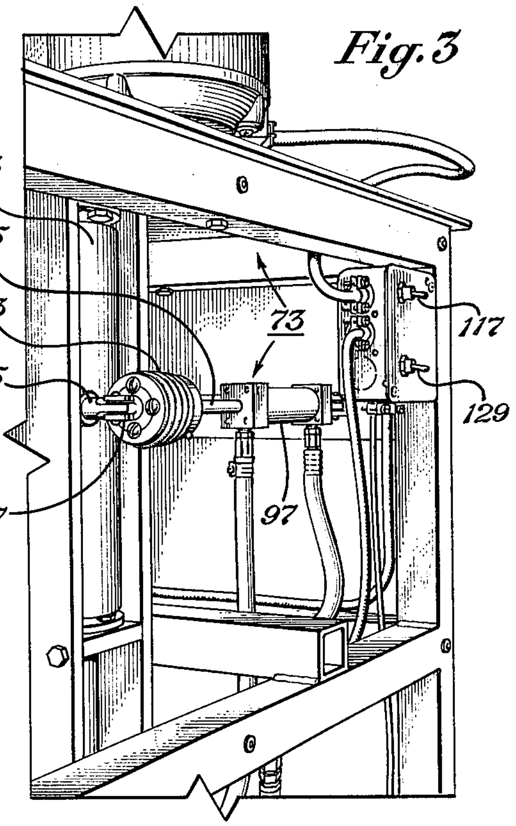
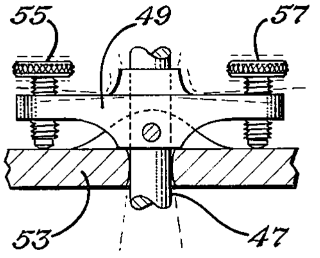
Fig.8
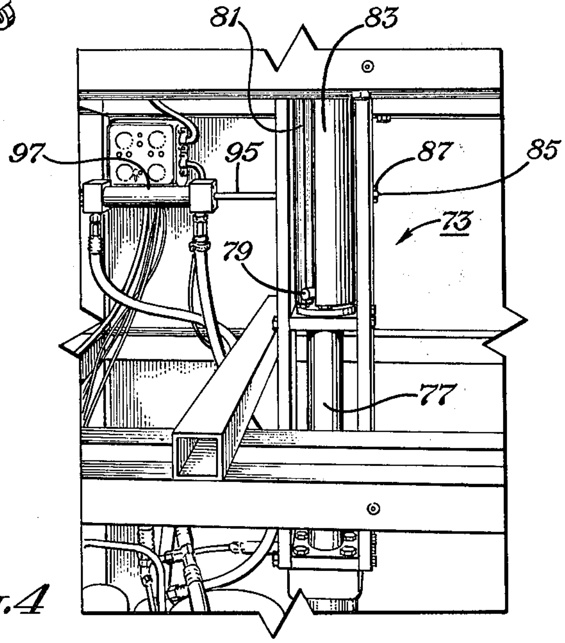
Fig.4

Fig.5
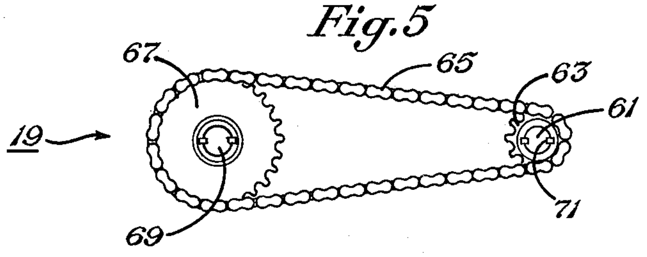
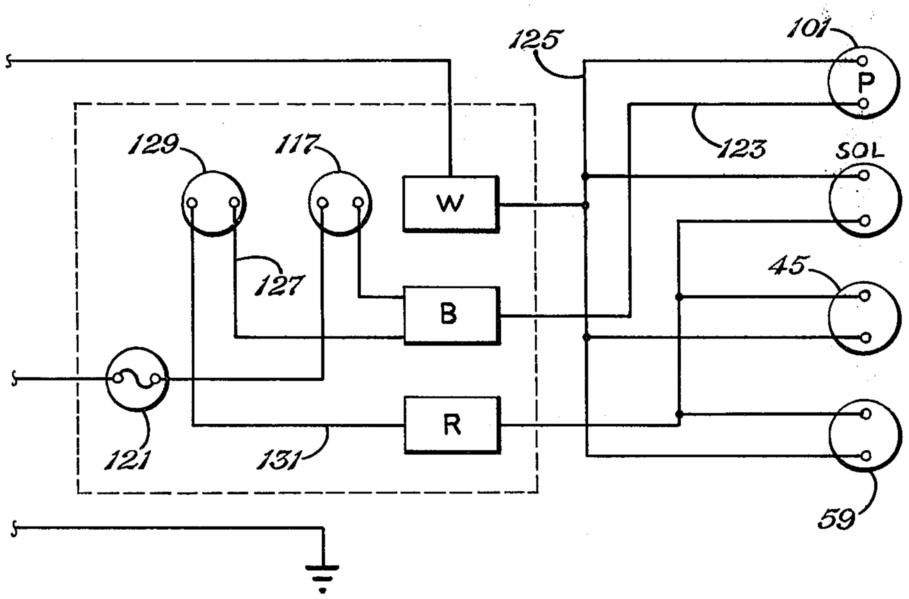
Fig.6
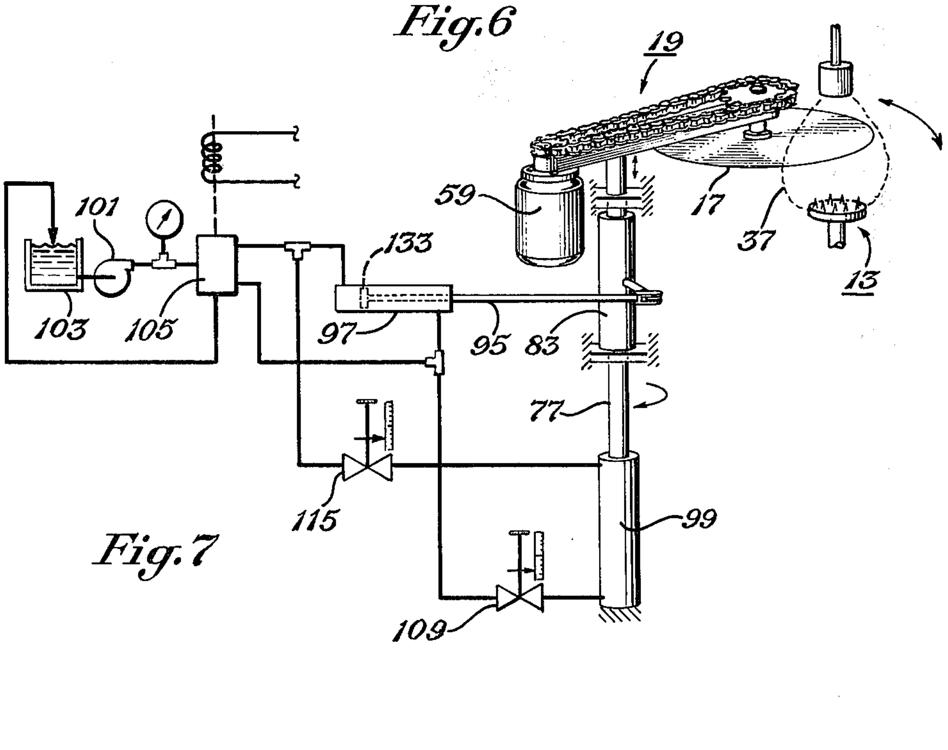
Fig.7

SLICER FOR HAM OR THE LIKE

FIELD OF THE INVENTION

This invention relates to apparatus for slicing meat. More particularly, this invention relates to apparatus for slicing ham or roast beef on the bone, or the like.

DESCRIPTION OF THE PRIOR ART

The prior art has seen the development of a wide variety of different apparatuses for slicing meat; such as hams, or the like. These have ranged from the band saw type devices in which the meat is slid past a rotating band saw, to reciprocatory blades or saws. Such apparatus cut through both meat and bone.

Other approaches have relied on de-boning first and then employed approaches such as the slideable tray moved next to a rotating blade.

The saws that also cut through the bone have the disadvantage of leaving bone fragment in the meat, frequently unpalatable. The requirement for de-boning was an expensive operation in today's society.

From the foregoing, it can be seen that the prior art did not provide a simple, economically operable device for slicing a ham or the like; that did not require preboning and that would cut all the way to the bone without actually cutting the bone and leaving bone fragments in with the meat. Moreover, the prior art type reciprocatory blades had slow cutting velocity that could not be increased without unduly tearing up the meat which they sliced.

SUMMARY OF THE INVENTION

Accordingly, it is an object of this invention to provide an apparatus that has a blade having relatively high and adjustable speeds to be able to cut at almost any velocity and obviate the deficiencies of the prior art.

It is a specific object of this invention to provide a slicer for slicing ham or the like having a rotating blade that can cut all the way to the bone without cutting the bone, as well as provide the other objects delineated above.

These and other objects will become apparent from the descriptive matter hereinafter, particularly when taken in conjunction with the appended drawings.

In accordance with this invention, there is provided an apparatus for slicing ham or the like comprising:

(a) ham holder adapted to hold the ham to be sliced and journalled for rotation so as to spin the ham;

(b) ham rotating means connected with the ham holder for rotating the ham holder and the ham therewithin;

(c) rotatable slicer means journalled for rotation for slicing the ham;

(d) blade rotating means connected with the blade for rotating the blade; and (e) lateral and upward moving means for moving the blade into and out of cutting engagement with the ham. The lateral and upward moving means has sufficient force to move the rotating blade through the ham to its bone and is adapted to reciprocate as necessary to accommodate the bone. The lateral and upward moving means has a rate adjustable upward moving means adapted for moving the blade upwardly in the proper correction slowly while simultaneously moving the blade into cutting engagement with the ham such that a continuous spiral slice can be effected through the ham and about the bone; the thickness of the slice being adjustable by adjusting the rate of upward movement.

In a preferred embodiment, the lateral and upward moving means are two separate means; a lateral moving means that includes a pivotally moveable arm for pivotally moving the rotating blade into slicing contact with the ham and a pivoting means for pivoting the arm; and a separate upward moving means having a rate control for controlling the rate of movement upwardly.

The following descriptive matter will describe specific preferred structures that have been found satisfactory.

BRIEF DESCRIPTION OF THE DRAWINGS

FIG. 1 is an isometric view of one embodiment of this invention.

FIG. 3 is a partial perspective view of the lateral moving means of FIG. 2.

FIG. 4 is a partial perspective view of the upward moving means of FIG. 2.

FIG. 5 is a partial plan view showing the means for rotating the blade.

FIG. 6 is a schematic view of the control circuit.

FIG. 7 is a schematic of another embodiment of this invention.

FIG. 8 is a partial cross-sectional view illustrating the angle adjusting means for the blade of FIG. 1.

DESCRIPTION OF PREFERRED EMBODIMENTS

Figure 2:
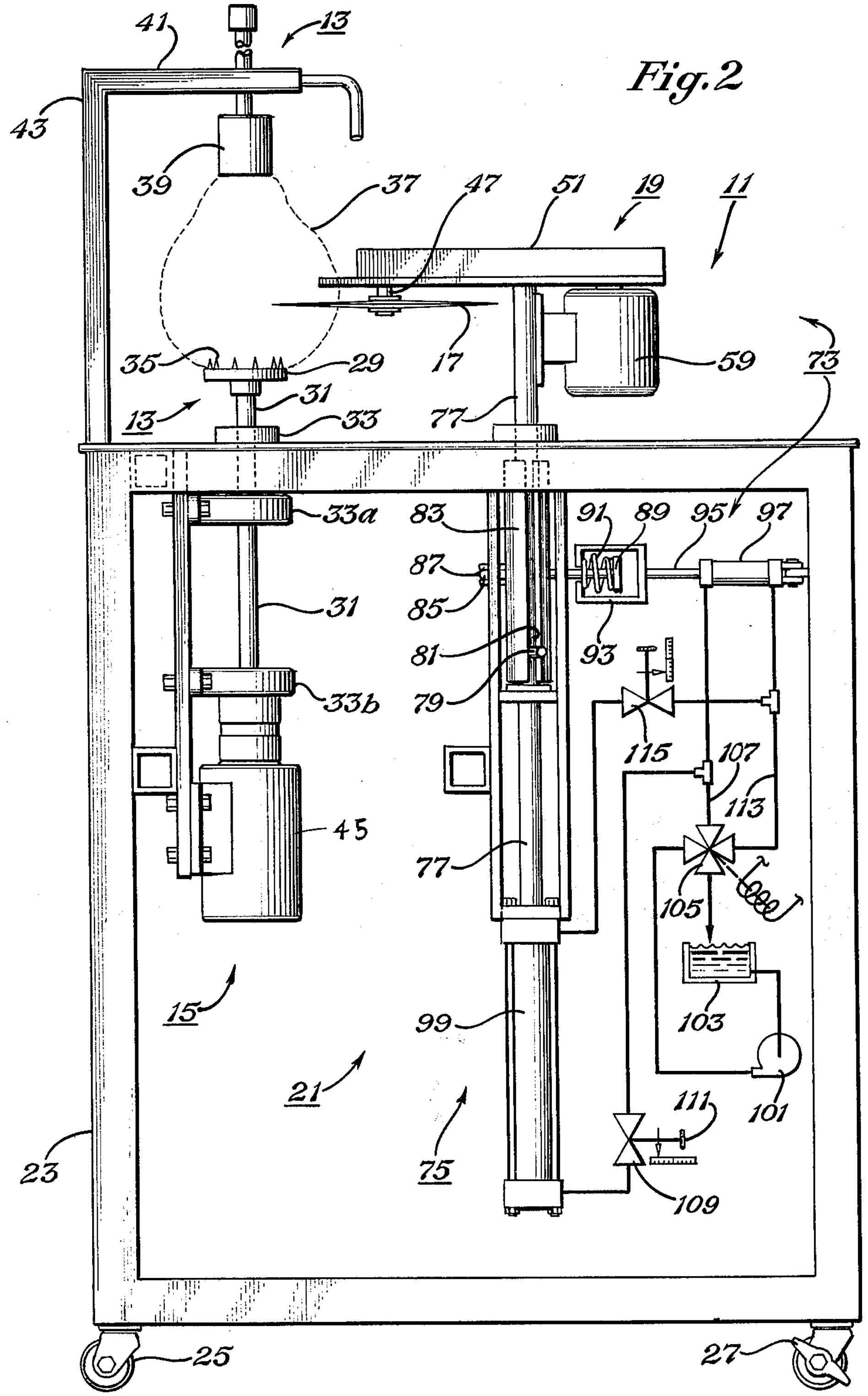
FIG. 2 is a side elevation view, partially diagramatic, illustrating one embodiment of this invention.

This invention is widely useful where cutting of a continuous spiral through relatively more soft material about a central core, however irregular, of a relatively less soft material. A, typical type of use is for slicing ham about its bone and it is in that context that this invention will be described, since it is in this context that this invention has been tested and found to be satisfactory.

Referring to FIGS. 1 and 2, the apparatus 11 includes a ham holder 13 adapted to hold the ham to be sliced and journalled for rotation so as to spin the ham; ham rotating means 15, FIG. 2, connected with the ham holder for rotating the ham holder and the ham therewithin; rotatable slicer blade 17 journalled for rotation for slicing the ham; blade rotating means 19 connected with the blade for rotating the blade; and lateral and upward moving means 21 for moving the blade into and out of cutting engagement with the ham and adapted for moving the blade upwardly in the proper direction slowly while simultaneously moving the blade into cutting engagement with the ham such that a continuous spiral slice is cut through the ham and about the bone.

The entire apparatus assembly is supported by the cabinet 23. As illustrated the cabinet 23 comprises internal skeletal members with affixed plates that can be readily removed for allowing access to the elements interiorly of the cabinet. The plates can be affixed by removeable nuts and bolts, screws, aircraft cowling fasteners or the like. In the illustrated embodiment, the cabinet is formed of metal such as steel or aluminum that can be easily connected together. Any other structural material that has adequate strength can be employed. The cabinet 23 is carried by four casters 25 having a brake means 27 for affixing it into one location. These casters, with and without brake means, are conventionally available and need not be described in detail herein. It is noteworthy that they are pivotal with respect to the cabinet 23 and have rotatable wheels so as to be easily moved to any location before the brake means 27 is set.

The ham holder 13 includes a bottom plate 29 that is affixed to a shaft 31 that is journalled for rotation within suitable bearings 33, FIG. 1; 33*a*, 33*b*, FIG. 2. The plate 29 contains a plurality of spikes 35 on which is impaled the ham 37 to be sliced. The ham holder also includes a shank holder 39 supported by a shaft 41 which is journalled in right angle member 43. As is evident, the shaft 41 is moveable upwardly and downwardly to firmly hold the ham for rotation with its shank end embedded in the shank holder 39. Specifically, the shaft 41 is moveable upwardly and downwardly to firmly impale the shank in the shank holder 39, as well as being journalled for rotation within the right angle member 43. If desired, bearings can be emplaced about the shaft 41, although experience has indicated that at the speed of rotation, or turning, of the ham, this is not necessary. The right angle member 43 is affixed to the skeletal framework of a cabinet 23 so as to provide positive support against lateral movement of the ham when it is being cut by the blade 17 as the ham is rotated by the ham rotating means 15.

The ham rotating means 15 may employ any of the conventional elements for importing torque to the shaft 31. As illustrated, the shaft 31 is supported within a pair of bearing means 33*a* and 33*b* for stability during rotation. The ham rotating means as illustrated comprises an electric motor 45, FIGS. 2 and 6. If desired, of course, it can comprise a pneumatic motor, a hydraulic motor or other element capable of imparting torque to the shaft, directly or through suitable speed reducing means. The speed of rotation of the ham is relatively slow, running from a few tens of revolutions per minute (RPM) to a few hundreds of revolutions per minute. It is only necessary that the ham be rotated so that a continuous spiral is cut by the blade 17.

The blade 17 is made of the finest cutting steel possible and may range in size from just large enough to penetrate through the ham to the bone to as much as 14 to 18 inches or more. The blade 17 is journalled for rotation for rotary slicing of the ham. It is mounted at a slight angle; for example, about 2½ degrees for 1/6th inch thick ham slice. The angle of tilt is described herein with respect to the horizontal plane. Specifically, the blade is tilted to lie in the angle of the cut. For example, the tilt is in one direction when cutting from the bottom up, ham rotating counterclockwise, blade rotating counterclockwise (CCW, viewed from above); whereas the tilt would be in another direction if sliced from the top down. The angle of tilt can be calculated as the arc tan of the slice thickness divided by the distance to the bone. For example, assuming a one-tenth inch (1/10″) thick slice, with four inches of meat on the bone, the ideal angle would be 1.4 degree (°); with a one-sixth inch thick slice, the ideal angle is 2.3 degrees. Of course, with roast beef or other objects having greater distance to the central bone, or core, the angle of tilt may be somewhat less. In the embodiments tried thus far the angle of tilt is within the range of 1°–5°; preferably, about $2° \pm \frac{1}{2}°$. The blade is mounted in a rotary block that can be adjustable for different angles as shown in FIG. 8. Specifically, the blade is carried by a shaft 47, FIGS. 2 and 8, which is journalled in a pivotally mounted block 49, FIG. 8, internally of the guard 51, FIG. 2. The block 49 is pivotal with respect to the surface 53, FIGS. 1 and 8, so that the angle can be changed by adjusting the respective threaded screws 55, 57. By this means, the angle can be changed to allow slicing the ham as thin as 1/10th inch thick slice by slowing the rate of upward movement of the blade and blade rotating means 19.

The blade rotating means may comprise any of the conventional torque imparting means such as motor driven pulley and belt combination, gear and sprocket combination or direct gear drive. Initial work was done with belt and pulley arrangements which achieved relatively high rotational speeds of about 800 revolutions per minute (RPM). It was subsequently found desirable to use slower rotational speeds and use a large force transmitting sprocket chain drive such as illustrated in FIG. 6. Therein, as shown in FIGS. 1, 2 and 5, torque is imparted by an electric blade motor 59, rotating shaft 61 keyed to sprocket wheel 63. The sprocket wheel 63 in turn drives the chain 65, which drives sprocket 67; which is, in turn, connected by a shaft 69 with the blade 17. The connection between the shafts and sprockets are by way of keys and keyway slots 71. The guard 51 protects the operator from becoming entangled in the chain and sprockets. The guard 51 may fan out if the sprocket wheel 67 is so large so as to make this necessary. By using this technique it has been found possible to lower the rotational speed of the blade from about 800 RPM to about 140 RPM when it is about 12–14 inches in diameter and get the requisite cutting, while lowering the tendency to sling meat particles away from the ham.

The lateral and upward moving means 21 may comprise separate, individually powered units, separate units powered by a common source with suitable adjustments, or a single integrated unit. As illustrated, it comprises separate lateral moving means 73 and upward moving means 75. The lateral and upward moving means includes a pivotally mounted, vertically moveable shaft 77, FIG. 2. The shaft 77 is pivotal because it is free to rotate and has an integrally connected pin 79 that moves reciprocally within a slot 81 in sleeve 83. The sleeve 83 may be formed from any material but is preferably one having a low coefficient of friction; such as, plastic like Nylon, Delrin, Orlon or the like. As can be seen in FIG. 3, the sleeve 83 is connected by the protruding member 85 with a yoke 87. The yoke terminates, as can be seen in FIG. 2, with an interior, reciprocally moveable flange 89 that engages spring 91. The spring 91 is contained within a laterally moveable housing 93 which is connected with ram rod, or shaft, 95. Consequently, when the ram 97 is operated, the rod 95 is moved laterally to the right in FIG. 2. This rotates the shaft 77 clockwise and swings the blade 17 into the page toward the ham 37. It is apparent that torque should be imparted to rotated the shaft 77 counterclockwise in FIG. 1 to swing the blade into the ham. The blade 17 and the motor 59 are mounted on a single lateral support, or pivotal arm 53 so as to pivot as a unit. To pivot the illustrated shaft 77 counterclockwise, the ram 97 is mounted to the rear left or right front of the shaft 77 so as to pivot counterclockwise the sleeve 83 and, hence, the pin 79 pivoting the shaft 77; similarly as illustrated in FIGS. 3 and 4.

The spring 91 has a coefficient of elasticity sufficient to force the blade through the meat, as the blade 17 and the ham 37 rotate with respect to each other, to cut the meat. The coefficient of elasticity is inadequate, however, to force the blade to cut the bone of the ham. Consequently, the reciprocally moveable arm will allow the blade to reciprocally move inwardly and outwardly against the force of the spring 91 even if the pressure on the ram 97 is so high as to cause the blade to cut into the bone. As will be described in more detail hereinafter with respect to FIG. 7, the force can be lessened and obviate the necessity for the spring 91. That embodiment will be described later hereinafter.

The upward moving means 75, FIG. 2, comprises a vertically oriented ram that moves the shaft 77 vertically, either positive or negative direction. It is relatively immaterial to this invention whether the ham is sliced from the top toward the bottom or from the bottom toward the top, since one is simply the negative of the other. As discussed herein, it will be discussed with respect to initially moving the blade toward the bottom of the ham and starting the slicing from the bottom and moving the blade upwardly as the blade and the ham rotate with respect to each other to cut a continuous spiral about the bone. The ram 99 forming a basic element of the upward moving means 75 may comprise a pneumatically powered ram, hydraulically powered ram, or even a rack and pinion type ram. As illustrated, it is a hydraulically powered ram.

The respective rams 97 and 99 are, in fact, powered from a single hydraulic pump 101 taking suction from a reservoir 103. The pump 101 simply circulates fluid until high pressure fluid is needed elsewhere. As is recognized, the commercially available pumps 101 have build-in, easily adjustable relief valves to adjust the output pressure at which they relieve fluid back to their suction side. A solenoid operated valve 105 controls the flow of high pressure hydraulic fluid, directing it to power the rams 97 and 99 for cutting or for returning to the "at rest" position. As illustrated, high pressure hydraulic fluid is sent by a conduit 107 to supply power to the rod end of the ram 97 and to the cylinder end of the ram 99. In order to swing the blade laterally before upward movement starts, an adjustable restricting means, or valve, 109 is provided for restricting the flow to the upward moving ram 99. This adjustable valve has a manually adjustable handle 111, with or without index scale, to allow adjusting the flow for obtaining a predetermined thickness of slice of ham. The restriction also ensures that the blade 17 is swung laterally into cutting engagement with the ham before upward movement is started, as indicated hereinbefore. Once slicing of the ham is completed, the solenoid valve 105 is actuated to its other position and high pressure hydraulic fluid is supplied by a conduit 113 to the cylinder end of ram 97 and to the rod end of the ram 99. Again, a restriction valve 115 is provided for restricting the flow of hydraulic fluid to the vertically moveable ram 99 in order to ensure that the blade is swung outwardly from the ham 37 before downward movement is started to return to its initial starting position The valve 105 allows hydraulic fluid to return to reservoir 103 as appropriate. If desired, the pump 101 can be de-energized and gravity will effect return of the blade 17 and the motor 59 to initial starting position.

Referring to the wiring diagram of FIG. 6, the master switch 117, FIGS. 3 and 6, is connected so as to start the pump 101. The neutral white wire is shown by "W" in its junction box. The main switch 117 is connected to the hot black wire by a fuse 121. The main black junction box B is connected to the pump 101 by a conductor 123. The pump 101 is also connected to neutral wire conductor 125. The junction box B is also connected by a conductor 127 with the solenoid switch 129, FIGS. 3 and 6. Solenoid switch is connected with red junction box R by a conductor 131 which is also connected with the solenoid, the blade motor and the ham rotation motor; all of which are also connected with the neutral white wire by conductor 125.

In operation, the master switch is flipped on to start the pump and supply hydraulic pressure to the solenoid valve 105. Subsequently, the solenoid switch 129 is turned on to energize the solenoid valve 105 and energizing the turn motor 45 for turning the ham and the motor 59 for rotating the blade. The solenoid valve 105 supplies hydraulic fluid at elevated pressure to swing the rotating blade 17 into cutting engagement with the rotating ham 37 and supply hydraulic fluid at a restricted rate to the upwardly moving ram 99. Consequently, the ham is cut into a continuous spiral, the slice thickness being controlled by the setting on the restriction valve 109. The angle of the cutting blade can be changed if the thickness is altered too much, as described with respect to FIG. 8.

The spring 91 allows the blade 17 to move to conform with the bone of ham, cutting to the bone but not through the bone.

When the ham is sliced, the solenoid switch 129 is turned off de-energizing respective motors 45, 59 and swinging the blade 17 outwardly away from the ham by supplying pressure to the cylinder end of the ram 97. Simultaneously, hydraulic pressure is applied to the rod end of the vertically end of the ram 99 but at a restricted rate as determined by restriction valve 115, as well as restriction valve 109. Thus the entire assembly of the motor 59 and cutting blade 17 slowly returns to its starting position.

It has been found possible to control the force on the ram 97 as illustrated in the schematic of FIG. 7 and obviate the requirements for the spring 91. In the illustrated schematic of FIG. 7, the operation and elements are substantially the same as described hereinbefore. Expressed otherwise, the hydraulic reservoir 1O3 supplies hydraulic fluid to pump 101 to the main solenoid valve 105 which directs it appropriately through the restriction valve 109 to the vertically oriented ram 99 and, more freely, to ram 97. This effects counterclockwise rotation of the shaft 77 to swing the cutting blade into engagement with the ham 37 as described hereinbefore. When the spiral is finished cutting, the hydraulic fluid is supplied to the cylinder end of the ram 97 to swing the blade out of cutting engagement with the ham and, thereafter effect lowering of the entire cutting assembly, including blade 17 and motor 59. As before, the sleeve 83 remains stationary vertically by being held between suitable cabinet supports although it is pivotally mounted so as to enable pivoting the shaft 77. In this embodiment, the hydraulic pressure is maintained at a force of about only 40 to 45 pounds per square inch and a full ½ inch shaft 95 restricts the force on the piston 133 interiorly of the ram 97 so as to force the blade 17 through the meat of the ham but not cut the bone of the ham 37.

In this embodiment, specific examples have been given. It is readily apparent that numerous changes can be made. For example, the hydraulic pressure may be run at higher or lower pressure if the cylinder and rod are suitably sized to give the desired force.

Early models employed an air compressor to compress air and used the compressed air over the hydraulic fluid to generate pressure. This required two separate hydraulic reservoirs in order to be able to return low pressure hydraulic fluid during operation. Consequently, the single hydraulically powered unit employing the single pump was employed. It is readily apparent that a multiplicity of smaller hydraulic pumps could be employed because of volumetric rate requirement of hydraulic fluid is exceptionally low.

While the spikes 35 have been illustrated relatively short, longer ones may be employed to more securely impale the ham in place. The spikes are preferably not long enough, however, to encounter the bone or to prevent the blade from cutting all the way to the bone.

While a plastic sleeve 83 has been described hereinbefore, it is readily apparent that self lubricated brass or the like may be employed and achieve the low coefficient to friction between it and its enclosed shaft 77 that is reciprocally removeable vertically. A simple, practical wiring schematic has been illustrated. It is readily apparent that more elaborate electronic controls can be employed if desired.

The cost of operating this invention is low, it is trouble free and it has very low maintenance costs.

By the use of this combination electro-hydraulic-mechanical rotary blade slicer, all of the objects delineated hereinbefore have been achieved while obviating difficulties with the complex mechanical arrangements of the prior art.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. Apparatus for slicing ham or the like comprising:

a. ham holder adapted to hold the ham to be sliced and journalled for rotation so as to spin the ham;

b. ham rotating means connected with said ham holder for rotating said ham holder and the ham therewithin;

c. rotary slicer blade journalled for rotation for slicing the ham when in cutting engagement therewith;

d. blade rotating means connected with said blade for rotating said blade;

e. lateral and upward moving means for moving said blade into and out of cutting engagement with the ham; said lateral and upward moving means having sufficient force to move the rotating blade in cutting engagement with the ham through the ham to its bone and adapted to reciprocate as necessary to accommodate said bone; said lateral and upward moving means having easily rate-adjustable upward moving means adapted for moving said blade upwardly in a proper direction slowly while simultaneously moving the blade into cutting engagement with the ham such that a continuous spiral slice is effected through the ham and about said bone; said lateral and upward moving means having the capability of an infinite number of adjustments of very small or large nature in the rate of movement of the upward moving means such that very small changes in thickness of the ham slices can be effected and different thickness slices can be cut.

2. The apparatus of claim 1 wherein said lateral and upward moving means includes:

a. pivotally moveable arm for pivotally moving the rotating blade into slicing contact with said ham; and b. pivoting means for pivoting said pivotally moveable arm for moving said rotating blade into cutting engagement with said ham; said pivotal means having a force of engaging said ham that is substantially uniform at all positions of cutting and is adjustable in magnitude for cutting any type of ham all the way from tender leg of lamb to tough country pork hams and wherein said rotatable slicer blade is journalled for rotation in the free end of the pivotally moveable arm.

3. The apparatus of claim 1 wherein said lateral and upward moving means comprises separate lateral moving means and upward moving means and each is separately controllable by controlling fluid flow and fluid pressure.

4. The apparatus of claim 3 wherein said lateral moving means includes:

a. pivotally moveable arm for pivotally moving the rotating blade into slicing contact with said ham; and b. pivoting means for pivoting said pivotally moveable arm for moving said rotating blade into cutting engagement with said ham; said pivotal means having a force of engaging said ham that is substantially uniform at all positions of cutting and is adjustable in magnitude for cutting any type of ham all the way from tender leg of lamb to tough country pork hams and wherein said rotatable slicer blade is journalled for rotation in the free end of the pivotally moveable arm.

5. The apparatus of claim 4 wherein said pivotally moveable arm is pivotally mounted in a cabinet; has a protruding arm that protrudes laterally and said pivoting means includes a ram to vary the control point for keeping a uniform force by a spring and a spring that are connected with said cabinet and said arm so as to effect a substantially uniform predetermined force for moving said cutting blade into cutting engagement with said ham, said bone of said ham being able to move said blade outwardly against the substantially uniform force of said spring being positioned by said ram to keep the force substantially uniform; and means for varying the pressure to said ram.

6. The apparatus of claim 4 wherein said pivotally moveable arm is pivotally mounted in a cabinet; has a protruding arm that protrudes laterally and said pivoting means includes a ram with a controlled pressure and surface area to provide controlled force against which said bone can move said blade outwardly; and means for varying said controlled pressure and hence the force with which said blade is moved through said ham.

7. The apparatus of claim 3 wherein said upward moving means comprises a vertical, fluid-powered ram with adjustable valve for controlling flow of said fluid and hence the rate of upward movement and hence the thicknesses of the slice of ham.

8. The apparatus of claim 7 wherein a restriction is provided in the feed of said fluid to the vertical ram such that said blade is moved out of cutting engagement with the ham before negative vertical movement occurs to restore the cutting blade for cutting another ham.

9. The apparatus of claim 1 wherein said blade is tilted with respect to the horizontal plane to lie in the angle of slice; said lateral and upward moving means comprise separate lateral moving means and upward moving means and each is separately controllable by controlling fluid flow and fluid pressure; said lateral moving means includes:

a. pivotally moveable arm for pivotally moving the rotating blade into slicing contact with said ham; and
b. pivoting means for pivoting said pivotally moveable arm for moving said rotating blade into cutting engagement with said ham; said pivotal means having a force of engaging said ham that is substantially uniform at all positions of cutting and is adjustable in magnitude for cutting any type of ham all the way from tender leg of lamb to tough country pork hams; and wherein said rotatable slicer blade is journalled for rotation in the free end of the pivotally moveable arm.

10. The apparatus of claim 9 wherein said blade is tilted at an angle within the range of 1–5 degrees with respect to horizontal and is the arc tan of the slice thickness to be cut divided by the distance from the surface to the central obstruction about which the slice is to be cut.

11. The apparatus of claim 10 wherein said blade is tilted at an angle of about $2° \pm \frac{1}{2}°$.

* * * * *